Jan. 6, 1970     A. J. SOLO     3,487,874
TEACHING AID
Filed May 13, 1968     2 Sheets-Sheet 1
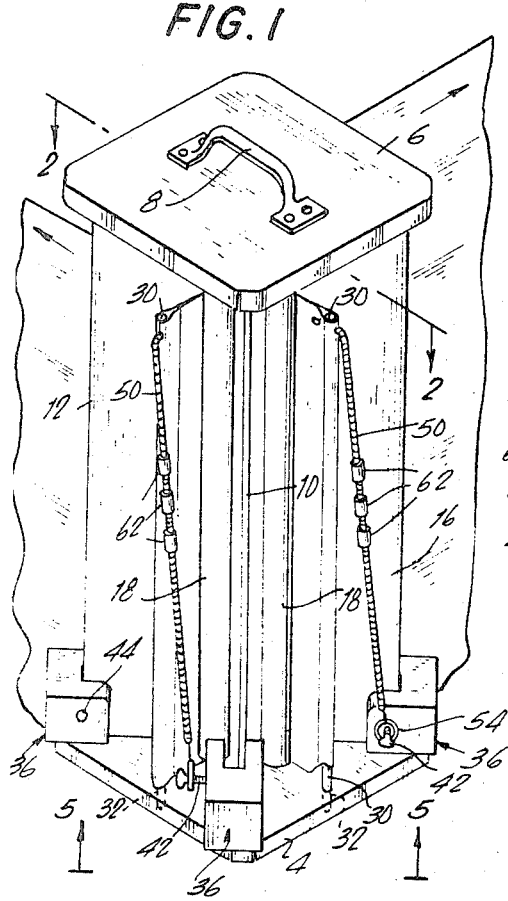
INVENTOR.
ALAN J. SOLO
By Friedman & Goodman
ATTORNEYS Jan. 6, 1970   A. J. SOLO   3,487,874
TEACHING AID
Filed May 13, 1968   2 Sheets-Sheet 2

INVENTOR.
ALAN J. SOLO
By Friedman & Goodman
ATTORNEYS

United States Patent Office 3,487,874
Patented Jan. 6, 1970

1

3,487,874
TEACHING AID
Alan J. Solo, Brooklyn, N.Y., assignor to Creative Environments Inc., New York, N.Y., a corporation of New York
Filed May 13, 1968, Ser. No. 728,613
Int. Cl. A47b *41/00*
U.S. Cl. 160—24                    9 Claims

ABSTRACT OF THE DISCLOSURE

A partition forming device comprising at least one spring tensioned rolled flexible partitioning shade mounted in a housing, spring means for holding said shade in tensioned position, portable means holding said spring means adapted to be mounted on said housing when said partitioning shade is in rolled position and to be mounted on a table top edge when said partitioning shade is in extended position and to receive said partitioning shade.

BACKGROUND OF THE INVENTION

Field of the invention

This invention relates to a teaching aid. More particularly, this invention relates to a device which is useful in dividing table space into partitions to enable a person working at the table to work independently of another seated at the same table on an opposite side of the partition.

Discussion of the prior art

Teaching in some of the more modern school systems has used a system of homogeneous grouping of students in a heterogeneous class. Specifically, groups of students having the same achievement level are seated at a table. A plurality of these tables corresponding to the various groups are arranged throughout the classroom. A portion of the instruction is done by teacher presence at the table for a period of time. Another portion of each lesson involves the students independent lesson work at the table while the teacher is teaching another group of students at a different table.

Due to human weaknesses and classroom distractions it is difficult oftentimes for the students to concentrate on the classwork in the teacher's absence. This causes students to copy another's work or to converse with neighbors. Conversely, it hampers others in concentrating. Thus, it is desirable to provide some means which provides portable table mountable partitions which can be set in place on a table and disposed to provide partitioned areas.

SUMMARY OF THE INVENTION

Objects of the invention

It is an object of this invention, therefore, to provide a means which functions as a teaching aid to provide partitioned areas in a table.

It is another object of this invention, therefore, to provide such a means which can be readily mounted on a table and easily removed therefrom.

It is a further object of this invention, therefore, to provide such a means wherein the partition can readily be closed to provide an open area.

These and other objects of this invention will become more apparent from the following description, accompanying drawings, and appended claims.

STATEMENT OF THE INVENTION

Broadly, this invention contemplates a partition forming device comprising at least one spring tensioned rolled flexible partitioning shade mounted in a housing, spring means for holding said shade in tensioned position, portable means holding said spring means adapted to be mounted on said housing when said partitioning shade is in rolled position and to be mounted on a table top edge when said partitioning shade is in extended position and to receive said partitioning shade.

In a particularly desirable embodiment, this invention contemplates a partition forming device comprising a plurality of spring tensioned rolled flexible partitioning shades each mounted in a separate portion of a housing, spring means associated with each of said shades for holding said shades in tensioned position, portable means associated with each of said spring means holding said spring means adapted to be mounted on said housing when its partitioning shade is in rolled position and to be mounted on a table edge when said partitioning shade is in extended position and to receive said partitioning shade.

In an especially desirable embodiment the device is provided with receiving means on said housing which holds the bottom portion of said partitioning shade when said partitioning shade is in rolled position and which function to receive another extended shade from another device working in combination therewith.

BRIEF DESCRIPTION OF THE DRAWINGS

The invention will be more readily understood and appreciated when reference is made to the accompanying drawings, in which FIGURE 1 is a perspective view of a preferred embodiment pursuant to the present invention;

FIGURE 2 is a sectional view taken along line 2—2 of FIG. 1;

FIGURE 3 is a detailed view of the portable partitioning shade holding means;

FIGURE 4 is a detail view of the partitioning shade of the device of the present invention partially broken away;

FIGURE 5 is a bottom view of the device of FIG. 1 taken along line 5—5 of FIG. 1;

DESCRIPTION OF THE PREFERRED EMBODIMENTS

Figure 7:
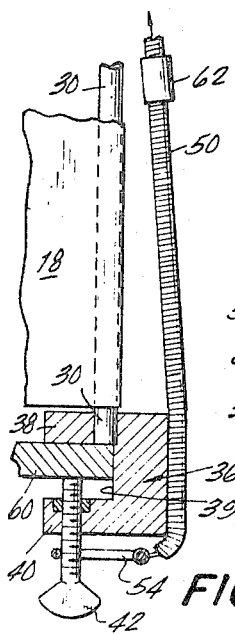
FIGURE 7 is a sectional view taken along line 7—7 of FIG. 6.

A preferred embodiment of the present invention is illustrated in the accompanying drawings, in which the device is generally designated by numeral 2. It comprises a base 4 and a top 6 to which is affixed handle 8. Permanent section members 10, 12, 14 and 16 are provided to define independent partioning units. Each unit comprises a tensioned rolled partitioning shade 18 comprising partitioning shade material 20 wound about a circular member 22 having a center member 24 which is affixed to bracket members 26 and 28 as shown in FIG. 4. The partitioning shade is always held in tensioned state even when substantially fully wound by the spring tensioning means of the shade itself. The end of the shade material is wrapped about a rod member 30 which has a protruding lower end adapted to fit into a hole or groove 32 provided in the base 4 for each partitioning unit.

Against each section member is mounted a portable partitioning shade mounting means 36 shown in detail in FIG. 3. It comprises a wooden block having jaws 38 and 40 defining mouth 39. The mouth is of such a size as to fit over the edge of a table top, i.e. the jaw is at least as wide as the thickness of the table top. Jaw 38 has an adjustable bolt member 42 threaded therethrough to allow the unit to be fastened snugly and firmly to a table top edge. Jaw 40 is provided with a hole 44 substantially the same size as hole 32 and similarly adapted to accommodate the extending lower extremity of rod member 30. The bottom of the device is provided with suction cups 51 proximate each corner of base 4 to allow the device to be securely held on a table without damaging its finish. Preferably, each suction cup pad is provided with a plurality of smaller suction cups 53.

Figure 10:
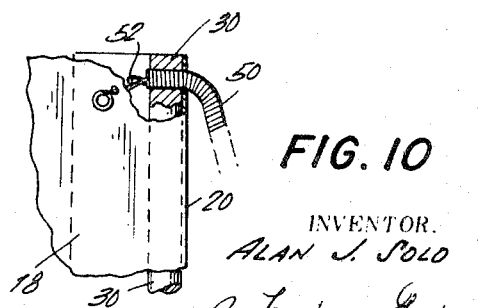
FIGURE 10 is a detail broken away partially to show the connection between the spring tensioning means and the partitioning shade.

A spring tensioning means 50 is affixed at the top of each partitioning shade passing through partitioning shade material 20 into rod member 30 and terminating in the shade material 20 rearward of the rod member 30 via member 52 as shown in FIG. 10. Spring tensioning means 50 is provided with a ring 54 adapted to tension the partitioning shade 18 in position when it is in rolled position as in FIG. 1 or extended position as in FIG. 6. The engagement of ring 54 over bolt 42 when the partition is in rolled position is shown in FIG. 1. FIG. 7 shows the position of the ring over bolt 42 when the portable partitioning shade mounting means is affixed about a table edge 60. The tensioning spring member 50 comprises a tightly wound flexible coil spring about which is placed plastic or wood grip members 62 which permit easy grasp of the tensioning spring member 50 without damage to the hand due to impingement of the spring coils against the hand.

Figure 6:
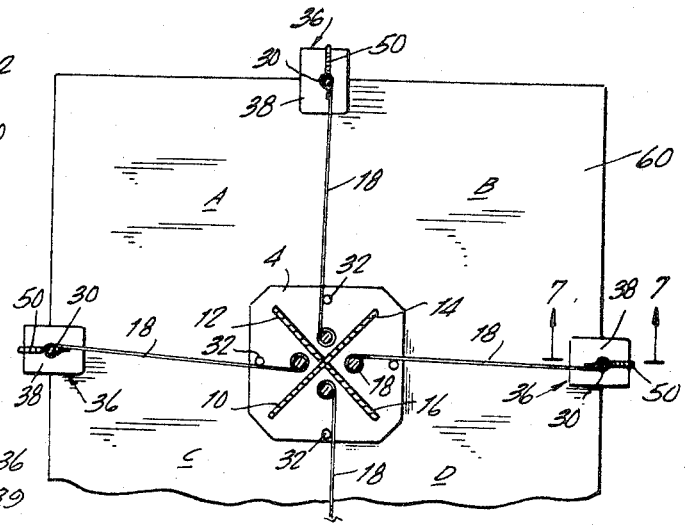
FIGURE 6 is a view similar to FIG. 2, showing the partitioning shades extended and mounted on the portable partitioning shade holding means mounted on a table.

The device can be readily used. In its stored position the mounting means 36 are mounted against the section members 10, 12, 14 and 16. The partitioning shade is held within hole 32 and tensioned by virtue of the tensioning means 50 engaged with bolt 42 via ring 54. When it is used the device is placed in the center of a table, the suction cups are placed in position and the mounting means 36 are each placed over an edge of a table top 60 as shown in FIG. 6. When this is done, the hole 32 is on the exposed side of the table. The partitioning shade is then unwound. The extending extremity of rod member 30 is inserted into hole 32. The partitioning shade is then again tensioned by drawing the spring tensioning means 50 to engage ring 54 over the wing of bolt 42 as seen in FIG. 7.

Figure 8:
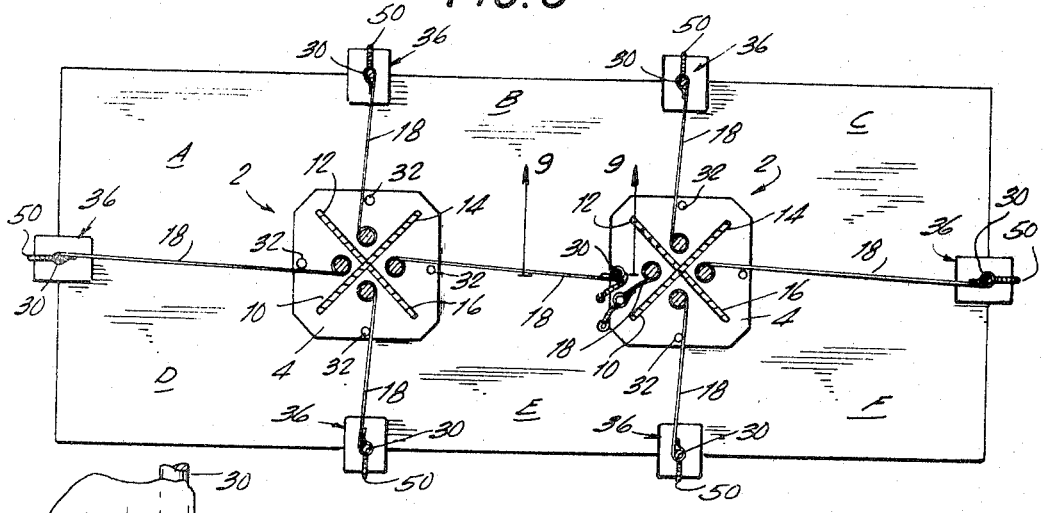
FIGURE 8 is a view similar to FIG. 6, showing two devices working in combination.
Figure 9:
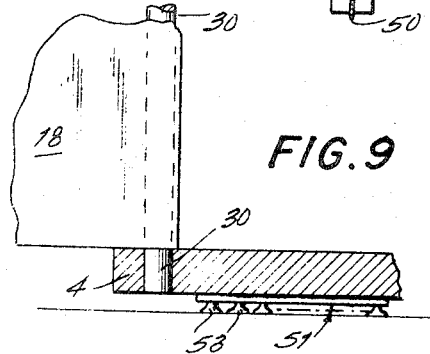
FIGURE 9 is a sectional view taken along line 9—9 of FIG. 8.

When a large table having a rectangular shape is employed, a plurality of individual units can be employed in combination. This is depicted in FIG. 8. Each unit has three of its four partitioning units in operation as shown in FIG. 6. The fourth unit of one unit is engaged in the hole in the base of the other unit. In FIG. 8, a partitioning unit of the device on the left is engaged in a hole 32 on the device on the right. In this case the unused partitioning shade unit is removed from the hole and is not in tensioned position. Thus the table is divided into six separate study units.

From the foregoing it is apparent that the device has many uses both in school and at home, especially in the case of large families. It can be used for the purpose described above or during tests to eliminate cheating. It helps students to concentrate and apply themselves. Various modifications of my device are apparent. For instance, the device can be provided with any number of partitioning units although four is very practical. It will be apparent that not all of the units need be in use at the same time. Additionally, the means for tensioning the partitioning shade can vary although use of a hole to hold the partitioning shade together with spring tensioning means is very convenient. Other modifications will be apparent from the above especially to one skilled in the education arts.

The terms and expressions used herein have been used as terms and expressions of illustration and not of limitation, as there is no intention, in the use of such terms and expressions, of excluding any equivalents, or portions thereof, as many modifications and departures are possible within the scope of the invention claimed.

What is claimed is:

1. A partition forming device comprising at least one spring tensioned rolled flexible partitioning shade mounted in a housing, spring means for holding said shade in tensioned position, portable means holding said spring means adapted to be mounted on said housing when said partitioning shade is in rolled position and to be mounted on a table top edge when said partitioning shade is in extended position and to receive said partitioning shade.

2. A partition forming device according to claim 1, wherein there are a plurality of partitioning shades each provided with associated spring means for holding the shade in tensioned position, each of said shades provided with associated portable means adapted to be mounted on said housing when its associated partitioning shade is in rolled position and to be mounted on a table edge when said partitioning shade is in extended position and to receive said partitioning shade.

3. A partition forming device according to claim 2, wherein said housing comprises a base member, a top and a plurality of vertically running section members about which said portable means is engageable.

4. A partition forming device comprising at least one spring tensioned rolled flexible partitioning shade mounted in a housing, spring means for holding said shade in tensioned position, portable means holding said spring means adapted to be mounted on said housing when said partitioning shade is in rolled position and to be mounted on a table top edge when said partitioning shade is in extended position and to receive said partitioning shade, wherein there are a plurality of partitioning shades each provided with associated spring means for holding the shade in tensioned position, each of said shades provided with associated portable means adapted to be mounted on said housing when its associated partitioning shade is in rolled position and to be mounted on a table edge when said partitioning shade is in extended position and to receive said partitioning shade and wherein said housing comprises a base member, a top and a plurality of vertically running section members about which said portable means is engageable, wherein said portable means comprises a jawed member provided with a threaded adjustable bolt.

5. A partition forming device according to claim 4, wherein one of the jaws of said jawed member is provided with a hole, said base of said housing is provided with a hole for each partitioning shade, each partitioning shade terminates in a rod member having a lower extremity protruding from the shade, the holes in said base and the holes in said portable means adapted to snugly receive the protruding lower extremity of the rod of the associated partitioning shade.

6. A partition forming device according to claim 5, wherein on the bottom of the base of said device there are a plurality of suction cup members.

7. A partition forming device according to claim 6, wherein a suction cup member is placed proximate each corner of said base and each suction cup member comprises a plurality of suction cups.

8. A partition forming device according to claim 5, wherein said spring means each comprises a tightly wound coil spring affixed to the upper end of said rod member and provided at the opposite end with a ring adaptable to engage said adjustable bolt.

9. A partition forming device according to claim 8, wherein hand grip means are provided on said coil spring to permit ready tensioning of said spring.

References Cited

UNITED STATES PATENTS 2,726,114   12/1955   Jacob et al. _____ 160—290 X

FOREIGN PATENTS 394,024   1/1909   France.

J. KARL BELL, Primary Examiner

U.S. Cl. X.R.

35—35, 77; 40—85; 160—351, 290